United States Patent
Takeda

(10) Patent No.: US 6,568,067 B2
(45) Date of Patent: May 27, 2003

(54) METHOD OF MANUFACTURING THE DIELECTRIC WAVEGUIDE

(75) Inventor: Toshikazu Takeda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 162 days.

(21) Appl. No.: 09/780,051

(22) Filed: Feb. 9, 2001

(65) Prior Publication Data

US 2001/0025409 A1 Oct. 4, 2001

(30) Foreign Application Priority Data

Feb. 10, 2000 (JP) ........................................ 2000-032882

(51) Int. Cl.[7] .......................... H01P 11/00; H01Q 13/00
(52) U.S. Cl. ............................ 29/600; 29/601; 29/847; 29/851; 29/DIG. 16; 216/24; 216/33; 216/63; 216/67; 216/72; 216/74; 333/239
(58) Field of Search ......................... 29/600, 601, 847, 29/DIG. 16, 851; 216/24, 33, 63, 67, 72, 74; 333/239

(56) References Cited

U.S. PATENT DOCUMENTS

| | | | |
|---|---|---|---|
| 209,705 A | | 10/1878 | Houdart |
| 2,810,892 A | * | 10/1957 | Blitz ............................ 333/238 |
| 2,945,195 A | | 7/1960 | Matthaei ....................... 333/73 |
| 5,122,768 A | | 6/1992 | Ito et al. ....................... 333/204 |
| 5,420,066 A | * | 5/1995 | Shima et al. .................. 438/40 |
| 5,473,296 A | * | 12/1995 | Ishikawa et al. ............. 333/239 |
| 5,624,529 A | * | 4/1997 | Shul et al. .................... 438/718 |
| 5,646,064 A | * | 7/1997 | Gaumont-Goarin et al. .. 438/29 |
| 5,667,700 A | * | 9/1997 | Rudigier et al. .............. 216/12 |
| 5,861,782 A | * | 1/1999 | Saitoh .......................... 333/239 |
| 6,104,264 A | * | 8/2000 | Ishikawa et al. ............. 333/239 |
| 6,391,214 B1 | * | 5/2002 | Kovacic ........................ 216/24 |

FOREIGN PATENT DOCUMENTS

| | | |
|---|---|---|
| EP | 0532770 A1 | 4/1992 |
| EP | 0858123 A3 | 8/1998 |
| EP | 933831 A1 | 8/1999 |
| EP | 1065745 A2 | 1/2001 |
| JP | 57166701 | 10/1982 |
| JP | 9181501 | 7/1997 |

* cited by examiner

Primary Examiner—Peter Vo
Assistant Examiner—Paul D Kim
(74) Attorney, Agent, or Firm—Dickstein, Shapiro, Morin & Oshinsky, LLP

(57) ABSTRACT

The present invention provides a method of efficiently manufacturing a dielectric waveguide with high reliability and precision. In the method, a resist material is formed on the outer surface of a green compact provided with a removal inhibiting layer, and predetermined portion of the green compact defined by the resist material is removed by the sand blasting method using the resist material as a mask, until the removal inhibiting layer is exposed to obtain a shaped green compact structure. The thus-obtained structure is fired to obtain a sintered body which comprises a dielectric strip and a wing.

8 Claims, 3 Drawing Sheets

METHOD OF MANUFACTURING THE DIELECTRIC WAVEGUIDE

BACKGROUND OF THE INVENTION

1. Field of the Invention

The present invention relates to a method of manufacturing a dielectric waveguide suitable for use as a transmission waveguide in the millimeter-wave band and microwave band, and for use in an integrated circuit, and a dielectric waveguide obtained by the manufacturing method.

2. Description of the Related Art

An example of a dielectric waveguide comprises a dielectric strip provided between two conductive planes, which are substantially parallel, so that electromagnetic waves are transmitted along the dielectric strip. One dielectric waveguide, a non radiative dielectric waveguide (referred to as "NRD guide" hereinafter) is developed as a transmission waveguide exhibiting less transmission loss, in which the distance between the two conductive planes is set to be a half or less of the wavelength of the transmitted wave to form a cut-off region, for preventing radiation of electromagnetic waves from the dielectric strip. The electromagnetic wave propagation modes of such NRD guides include two types including an LSM mode and an LSE mode, and the LSM mode exhibiting less loss is generally used.

FIGS. 3 and 4 are sectional views respectively showing the two typical constructions of conventional NRD guides.

FIG. 3 shows a normal type NRD guide 1 comprising a dielectric strip 4 provided between two conductive plates 2 and 3 which are arranged in parallel to each other. This normal type NRD guide 1 is disclosed in, for example, Japanese Examined Patent Publication No. 62-35281.

FIG. 4 shows a so-called winged type NRD guide 5 in which wings 8 and 9 are integrally formed on dielectric strips 6 and 7, respectively, and conductors 10 and 11 are provided on the surfaces of the dielectric strips 6 and 7, and the wings 8 and 9, respectively, which face outward, the two dielectric strips 6 and 7 being arranged opposite to each other. The conductors 10 and 11 can be formed by, for example, an evaporation method, a method of baking conductive paste containing silver or the like. Such a winged type NRD guide 5 is disclosed in Japanese Unexamined Patent Publication No. 6-260814.

In the winged type NRD guide 5, the conductors 10 and 11 can be easily aligned with the dielectric strips 6 and 7, respectively, as compared with the normal type NRD guide 1, and the winged type NRD guide 5 has the advantage of excellent reproducibility of characteristics.

Examples of materials for the dielectric strips include synthetic resins such as Teflon (registered trademark of U.S. Du Pont), and the like, and dielectric ceramic. The dielectric ceramic has a higher dielectric constant than a synthetic resin, whereby the bend loss of curved portions of the dielectric strips can be decreased, and miniaturization can be achieved. Therefore, at present, development of a dielectric strip using dielectric ceramic is proceeding.

In the winged type NRD guide 5 shown in FIG. 4, the width W of each of the dielectric strips 6 and 7, and the thickness T of each of the wings 8 and 9 are defined by the dielectric constant of the dielectric material, which constitutes these components, and the frequency of the electromagnetic wave used. Each of the width w and the thickness T generally decreases as the dielectric constant or the frequency used increases.

The dielectric strips 6 and 7 and the wings 8 and 9 of the winged type NRD guide 5 shown in FIG. 4 are produced by using dielectric ceramic and one of two methods: a first conventional method comprising cutting a plate-shaped ceramic sintered body obtained by firing, to impart the shapes of the dielectric strips 6 and 7 and the wings 8 and 9 to the ceramic sintered body, or a second conventional method comprising laminating a plurality of green sheets including green sheets each comprising an opening or notch, which is previously provided for making the wings 8 and 9 thinner than the dielectric strips 6 and 7, and then firing the resultant green sheet laminate to form the dielectric strips 6 and 7 and the wings 8 and 9, each having the desired shape, as disclosed in Japanese Unexamined Patent Publication No. 10-224120.

However, in the first conventional method, the fired ceramic sintered body is very hard, thereby causing the problem of requiring much time and labor for cutting the ceramic sintered body in the desired shape. Also, each of the wings 8 and 9 has a relatively small thickness T, thereby causing the problem of easily producing cracking or chipping during the cutting step.

On the other hand, in the second conventional method, it is very difficult to precisely cut the green sheets to the width W of the dielectric strips 6 and 7, and to precisely align the plurality of green sheets, thereby causing the problem of poor workability. Particularly, a NRD guide frequently used as a radio frequency transmission waveguide is required to have very high dimensional precision for the dielectric strips, and thus the problem of poor workability becomes serious.

SUMMARY OF THE INVENTION

The present invention provides a method of manufacturing a dielectric waveguide with reduced the manufacturing cost, with increased dimensional precision in the dielectric strips and wings, and with less cracking or chipping in the course of the processing process, and a dielectric waveguide obtained by the manufacturing method.

The present invention is aimed at a method of manufacturing a winged type NRD guide comprising a plurality of conductors having substantially parallel planes, a dielectric strip arranged between the planes of the plurality of conductors, and a wing integrally formed to extend from the dielectric strip along each of the planes of the conductors. In order to resolve the above technical problems, the method of manufacturing a dielectric waveguide of the present invention is characterized by the following construction.

In a first aspect of the present invention, the manufacturing method comprises the step of preparing a green compact containing an inorganic powder and an organic binder for forming a dielectric strip and a wing by using a part of the green compact, the step of forming a resist material on the outer surface of the green compact with an opening formed at a position of the resist material corresponding to the wing, the step of removing the portion of the green compact, which is exposed through the opening, to a desired amount by using the resist material as a mask to form an unfired structure having the shapes of the dielectric strip and the wing, the step of removing the resist material, the step of firing the structure to obtain a sintered body having the dielectric strip and the wing, the step of providing a conductor on the surfaces of the dielectric strip and the wing, which face outward, and the step of arranging two sintered bodies in a state in which the dielectric strips are opposed to each other.

The method of manufacturing a dielectric waveguide in the first aspect of the present invention further comprises, in the step of removing the portion of the green compact exposed through the opening, the step of preparing a difficult-to-remove material having a lower removal rate than that of the green compact, to provide a removal inhibiting layer comprising the difficult-to-remove material in a portion of the green compact corresponding to the thickness of the wing in preparing the green compact, so that the step of removing the portion of the green compact exposed through the opening is carried out until the removal inhibiting layer is exposed.

In the first aspect of the present invention, in preparing the green compact, a plurality of green sheets containing an inorganic powder and an organic binder are preferably prepared and laminated.

In a second aspect of the present invention, the manufacturing method comprises the step of preparing a sintered ceramic substrate for forming a portion of a dielectric strip and a wing, the step of preparing a green sheet containing an inorganic powder and an organic binder for forming the remainder of the dielectric strip, the step of fixing the green sheet on the ceramic substrate, for preparing a composite laminate, the step of forming a resist material on the outer surface of the composite laminate with an opening formed at a position of the resist material corresponding to the wing, the step of removing the portion of the green sheet, which is exposed through the opening, to a desired amount by using the resist material as a mask to form an unfired structure having the shapes of the dielectric strip and the wing, the step of removing the resist material, the step of firing the structure to obtain a sintered body having the dielectric strip and the wing, the step of providing a conductor on the surfaces of the dielectric strip and the wing, which face outward, and the step of arranging two sintered bodies in a state in which the dielectric strips are opposed to each other.

The method of manufacturing a dielectric waveguide in the second aspect of the present invention further comprises, in the step of removing the portion of the composite laminate exposed through the opening, the step of preparing a difficult-to-remove material having a lower removal rate than that of the green sheet, to provide a removal inhibiting layer comprising the difficult-to-remove material between the ceramic substrate and the green sheet in the composite laminate in preparing the composite laminate, so that the step of removing the portion of the composite laminate exposed through the opening is carried out until the removal inhibiting layer is exposed.

In the second aspect of the present invention, the ceramic substrate and the green sheet preferably contain the same ceramic material.

In the step of fixing the green sheet on the ceramic substrate, a plurality of green sheets are preferably laminated on the ceramic substrate with the removal inhibiting layer provided therebetween.

In the green compact in the first aspect of the present invention or the composite laminate in the second aspect of the present invention, the step of removing the portion exposed through the opening is preferably carried out by a sand blasting method.

In the use of the sand blasting method, the removal rate of a material to be removed by the sand blasting method generally increases as the hardness of the material increases. Therefore, the removal inhibiting layer preferably comprises a softer material than the green compact or the green sheet. Therefore, the difficult-to-remove material which constitutes the removal inhibiting layer can be easily realized by a composition containing a larger amount of organic component than the green compact or the green sheet. The difficult-to-remove material preferably contains substantially no inorganic component.

In both the first and second aspects of the present invention, the step of removing the resist material is preferably carried out at the same time as the step of firing the structure.

The present invention also provides a dielectric waveguide obtained by the above-described manufacturing method.

Other features and advantages of the present invention will become apparent from the following description of embodiments of the invention which refers to the accompanying drawings, in which like references denote like elements and parts.

DETAILED DESCRIPTION OF EMBODIMENTS OF THE INVENTION

Figure 4:
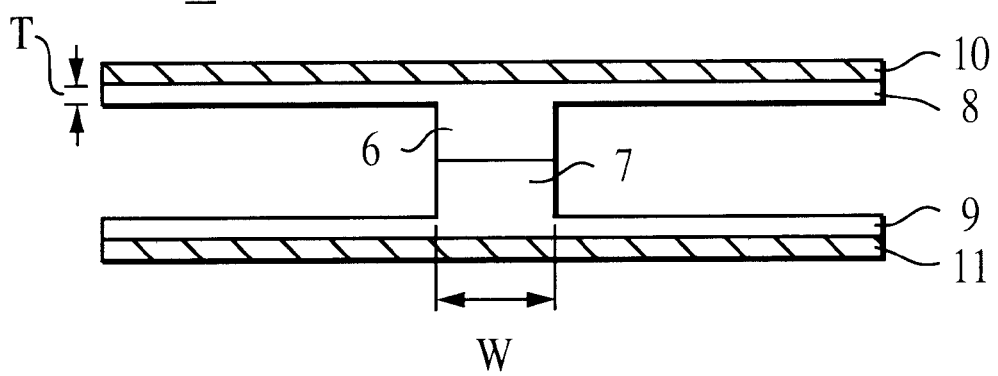
FIG. 4 is an enlarged sectional view showing a conventional winged type NRD guide which is of background interest to the present invention.

FIGS. 1A, 1B, 1C, 1D, 1E, 1F and 1G are sectional views schematically showing in turn a plurality of steps of a method of manufacturing a dielectric waveguide in accordance with a first embodiment of the present invention. The winged type NRD guide 5 shown in FIG. 4 is manufactured by this manufacturing method.

Figure 1A:
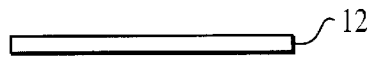
FIGS. 1A, 1B, 1C, 1D, 1E, 1F and 1G are sectional views schematically showing in turn a plurality of steps of a method of manufacturing a dielectric waveguide in accordance with a first embodiment of the present invention.

First, as shown in FIG. 1A, a plurality of green sheets 12 containing an inorganic powder and an organic binder are prepared.

As the inorganic powder, a powder of ceramic such as alumina, cordierite, forsterite, spinel, or the like, glass or the like can be used, and any inorganic powder can be used as long as the powder has no problem with processing precision and propagation properties. Since the use of dielectric ceramic advantageously permits miniaturization as compared with the use of a synthetic resin such as Teflon or the like, an inorganic material having a dielectric constant of 4 or more is preferably used as the inorganic material which constitutes the inorganic powder.

Figure 1B:
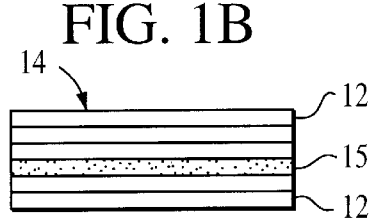
Figure 1C:
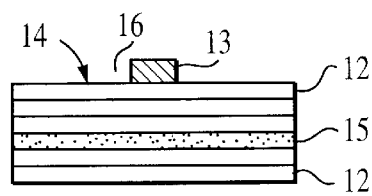
Figure 1D:
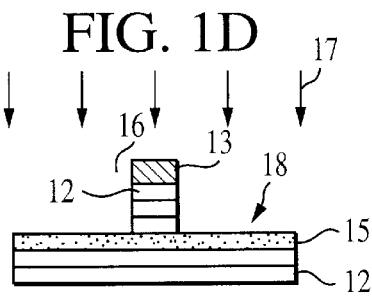

As the organic binder, a butyral resin, an acryl resin, an urethane resin, an epoxy resin, a vinyl resin, or the like can be used, and any resin can be used as long as the resin can be removed more easily than the resist material 13 used in the removal step shown in FIG. 1D.

In order to improve adhesion of the plurality of the green sheets 12 and handling workability thereof, each of the green sheets 12 may further contain a plasticizer such as dioctyl phthalate, dibutyl phthalate, α-terpineol, or the like.

In order to produce the green sheets 12, a doctor blade method, a comma coating method, a roll coating method, a casting method, or the like can be used.

Next, as shown in FIG. 1B, the plurality of green sheets 12 are laminated, and then pressed to prepare a green compact 14. The green compact 14 is used for forming the dielectric strip 6 or 7, and the wing 8 or 9 shown in FIG. 4 by using a part of the green compact 14.

The thickness of the green compact 14 is preferably adjusted so that the dielectric strip 6 or 7 obtained through the firing step, which will be described below, has a thickness permitting propagation of electromagnetic waves. Therefore, for example, the thickness of each of the green sheets 12 is preferably set to about several $\mu$m to several mm, and the thickness of the green compact 14 is preferably adjusted by controlling the number of the green sheets laminated.

Referring to FIG. 1B, a removal inhibiting layer 15 is provided at an intermediate position of the green compact 14 in the lamination direction thereof. The removal inhibiting layer 15 comprises a difficult-to-remove material having a lower removal rate than that of the green sheets 12 in the removal step shown in FIG. 1D.

The difficult-to-remove material prepared for providing the removal inhibiting layer 15 at the predetermined position in the green compact 14 has, for example, a composition containing a larger amount of organic component than the green sheets 12, and preferably containing substantially no inorganic component.

In order to form the removal inhibiting layer 15 by using the difficult-to-remove material, for example, the difficult-to-remove material can be applied to one of the main surfaces of the specified green sheet 12 by a vapor deposition or printing method. However, a preferred method comprises preparing a sheet used as the removal inhibiting layer 15 by the same method as the green sheets 12, and then laminating the sheet together with the green sheets 12 because common equipment and sheet forming conditions can be used.

As seen from the description below, the portion of the removal inhibiting layer 15 in the green compact 14 is a portion in the green compact 14 corresponding to the thickness of the wing 8 or 9.

Next, as shown in FIG. 1C, a resist material 13 is formed on the outer surface of the green compact 14. The resist material 13 defines an opening 16 corresponding to the wing 8 or 9.

In order to form the resist material 13 patterned to form the opening 16, for example, the printing method or the like can be used. However, a photolithographic technique is preferably used from the viewpoint that a pattern having excellent dimensional precision can be formed. As the material which constitutes the resist material 13, any material can be used as long as it has sufficient resistance in the removal step shown in FIG. 1D. Examples of such materials which can be used for the resist material 13 include polyvinyl alcohol, polymethacrylates, cellulose resins, poly-α-methylstyrene, urethane resins, and the like.

Next, as shown in FIG. 1D, the portion of the green compact 14, which is exposed through the opening 16, is removed to a predetermined amount by using the resist material 13 as a mask. In this removal step, any one of various methods such as sand blasting, wet etching, chemical milling, ion milling, reactive ion etching, and the like can be used. However, the sand blasting method is most preferred because the methods using a vacuum process are relatively undesirable for finely processing the green sheets 12 containing moisture and the organic component, and relatively high dimensional precision can be realized in removal to a depth of as large as 0.2 to 1.0 mm, which is required for producing the dielectric strip 6 or 7.

The above-described sand blasting method can remove the portion of the green compact 14, which is exposed through the opening 16, to the desired amount by spraying abrasive grains onto the portion, as shown by arrows 17 in FIG. 1D. In this case, the dry blasting method comprising spraying abrasive grains together with a gas, or the wet blasting method comprising spraying the abrasive grains together with a liquid may be used.

As the abrasive grains used in the sand blasting method, abrasive grains of alumina, silicon carbide, carbon, rigid plastic, or the like can be used. As the gas, air, nitrogen, argon, or the like can be used. As the liquid, water, ethyl alcohol, isopropyl alcohol, or the like can be used.

The removal step by the sand blasting method is carried out until the removal inhibiting layer 15 is exposed as shown in FIG. 1D. Since the removal inhibiting layer 15 comprises the difficult-to-remove material having a lower removal rate than that of the green compact 14, as described above, the removal inhibiting layer 15 is provided in the green compact 14, and the removal is carried out until the removal inhibiting layer 15 is exposed, thereby providing a margin for control of the time required for carrying out the removal step. Therefore, it is possible to easily control the predetermined removal amount, and prevent excessive removal. The effect of the removal inhibiting layer 15 is increased as the difference between the removal rates of the green compact 14 and the removal inhibiting layer 15 increases.

In the use of the above-described wet etching method in the removal step in place of the sand blasting method, the difficult-to-remove material which constitutes the removal inhibiting layer 15 preferably has high chemical resistance. On the other hand, in the use of the chemical milling method, the ion milling method, or the reactive ion etching method, the difficult-to-remove material which constitutes the removal inhibiting layer 15 preferably has gas corrosion resistance.

In this way, an unfired structure 18 having the shape of the dielectric strip 6 or 7 and the wing 8 or 9 is produced.

Figure 1E:
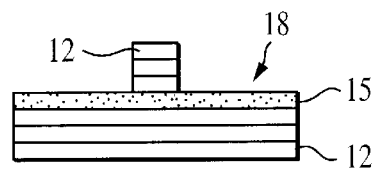

Next, as shown in FIG. 1E, the resist material 13 is removed from the structure 18. As the method of removing the resist material 13, for example, the method of immersing the resist material 13 in a solvent to dissolve it can be used. In the firing step, the method of removing the resist material 13 by decomposing combustion may be used. Generally, as the method of removing the resist material 13, any method may be used as long as no undesirable deformation possibly occurs in the unfired structure 18.

Figure 1F:

Next, the structure 18 is fired to obtain a sintered body 19 having the dielectric strip 6 or 7, and the wing 8 or 9, as shown in FIG. 1F. This firing step can be carried out either a non-oxidative atmosphere or an oxidizing atmosphere, and a conventional belt furnace or batch furnace, or the like can also be used for carrying out the firing step.

Figure 1G:
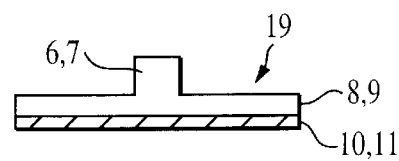

Next, as shown in FIG. 1G, a conductor 10 or 11 is provided on the surface of the dielectric strip 6 or 7 and the wing 8 or 9, which faces outward.

In order to form the conductor 10 or 11, for example, an evaporation method, a printing method, a sputtering method, a sol-gel method, a plating method, or the like can be used. Alternatively, the conductor 10 or 11 may be provided by attaching a conductor plate such as a metal plate separately prepared to the predetermined surface of the sintered body 19, or by applying conductive paste to the unfired structure 18 by the printing method or the like, and then baking the conductive paste at the same time as firing of the structure 18.

Two sintered bodies shown in FIG. 1G are prepared, and arranged so that the dielectric strips 6 and 7 are opposed to each other to complete the winged type NRD guide 5 shown in FIG. 4.

FIGS. 2A, 2B, 2C, 2D, 2E, 2F, 2G and 2H are sectional views schematically showing in turn a plurality of steps of a method of manufacturing a dielectric waveguide in accordance with a second embodiment of the present invention. The manufacturing method shown in FIGS. 2A–2H is also adapted to the manufacture of the winged type NRD guide 5 shown in FIG. 4.

In FIGS. 2A–2H, the components corresponding to the components shown in FIGS. 1A–1G are denoted by the same reference numerals. Each of the components corresponding to those shown in FIGS. 1A–1G can be produced by substantially the same method as the method described above with reference to FIGS. 1A–1G.

Figure 2A:
FIGS. 2A, 2B, 2C, 2D, 2E, 2F, 2G and 2H are sectional views schematically showing in turn a plurality of steps of a method of manufacturing a dielectric waveguide in accordance with a second embodiment of the present invention.

First, as shown in FIG. 2A, a sintered ceramic substrate 20 is prepared. The ceramic substrate 20 is used for forming a part of the dielectric strip 6 or 7, and the wing 8 or 9. The ceramic substrate 20 can be obtained by firing the green sheet 12 shown in, for example, FIG. 1A.

Figure 2B:
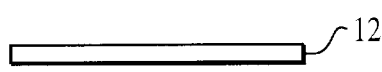

On the other hand, as shown in FIG. 2B, the same green sheet 12 as that shown in FIG. 1A is prepared. The green sheet is used for forming the remainder of the dielectric strip 6 or 7.

Figure 2C:
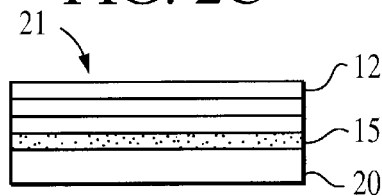

Next, as shown in FIG. 2C, the green sheet 12 is fixed to the ceramic substrate 20 to prepare a composite laminate 21. In preparing the composite laminate 21, a plurality of the green sheets 12 are preferably laminated on the ceramic substrate 20, as shown in the drawing.

Also, the removal inhibiting layer 15 comprising the difficult-to-remove material is provided between the ceramic substrate 20 and the green sheets 12 in the composite laminate 21.

Figure 2D:
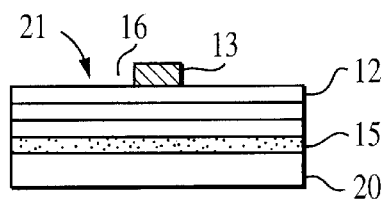

Next, as shown in FIG. 2D, the resist material 13 is formed on the outer surface of the composite laminate 21. The resist material 13 is patterned in a shape in which the opening 16 is formed in the portion corresponding to the wing 8 or 9.

Figure 2E:
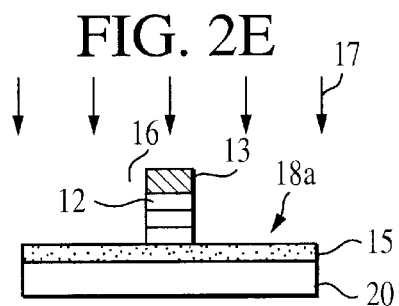

Next, as shown in FIG. 2E, the portions of the green sheets 12, which are exposed through the opening 16, are removed by using, for example, the sand blasting method using the resist material 13 as a mask until the removal inhibiting layer 15 is exposed, as shown by arrows 17. In this way, an unfired structure 18a having a shape comprising the dielectric strip 6 or 7, and the wing 8 or 9 is prepared.

Figure 2F:
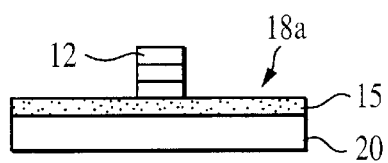

Next, as shown in FIG. 2F, the resist material 13 is removed. The resist material 13 may be removed by decomposing combustion in the subsequent firing step.

Figure 2G:

Next, the structure 18a is fired to obtain the sintered body 19 having the dielectric strip 6 or 7 and the wing 8 or 9, as shown in FIG. 2G. In this firing step, the green sheets 12 provided in the structure 18a are sintered, and joined to the ceramic substrate 20.

Figure 2H:
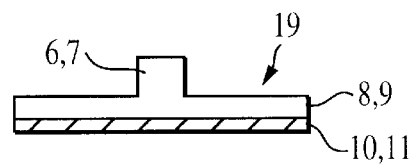
Figure 3:
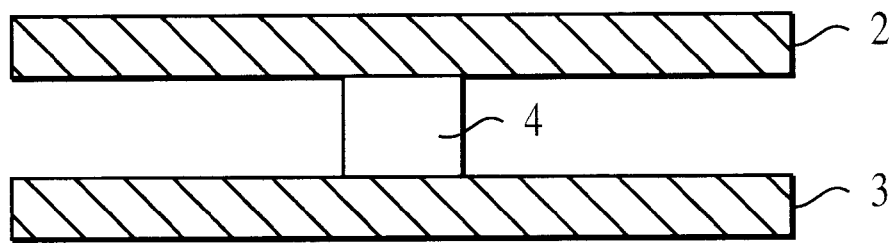
FIG. 3 is an enlarged sectional view showing a conventional normal type NRD guide.

Next, as shown in FIG. 2H, the conductor 10 or 11 is provided on the surface of the dielectric strip 6 or 7 and the wing 8 or 9 of the sintered body 19, which face outward. The conductor 10 or 11 may alternatively be provided in the stage of the unfired structure 18a shown in FIG. 2F.

Next, two sintered bodies 19 are arranged so that the dielectric strips 6 and 7 are opposed to each other to complete the winged type NRD guide 5 shown in FIG. 4.

In the second embodiment, the previously fired ceramic substrate 20 defines a part of the dielectric strip 6 or 7, and the wing 8 or 9 in the completed NRD guide 5. Therefore, the thickness of the wing 8 or 9 can be set without allowing for shrinkage in degreasing, which volatilizes organic components such as organic binder, and in the firing step. In the first embodiment, undesirable deformation possibly occurs in the green sheets 12 in progress of the firing step, while in the second embodiment, the firing step proceeds with the green sheets 12 reinforced with the ceramic substrate 20, thereby advantageously preventing the deformation of the green sheets 12. Therefore, particularly, the precision of the thickness and shape of the wing 8 or 9 can be improved.

In the above-mentioned first and second embodiments, as shown in FIGS. 1F and 2G each showing the state after the firing step, the removal inhibiting layer 15 is removed by the firing step. This applies to the case in which the difficult-to-remove material constituting the removal inhibiting layer 15 contains only the organic component with substantially no inorganic component. If, however, the difficult-to-remove material contains an inorganic component, the inorganic component contained in the removal inhibiting layer 15 remains even after firing. However, by using the same inorganic component as that contained in the green sheets 12 or the ceramic substrate 20, the remaining inorganic component presents no problem.

The method of manufacturing a dielectric waveguide of the present invention will be illustrated in further detail below based on examples.

EXAMPLE 1

Example 1 relates to the first embodiment shown in FIGS. 1A–1G.

In order to prepare the green sheet 12, a spinel power as an inorganic powder, butyral resin "BM-2" (produced by Sekisui Chemical Co., Ltd.) as an organic binder, dioctyl phthalate as a plasticizer, and ethyl alcohol and toluene as organic solvents were prepared, and predetermined amounts of these materials were weighed and mixed in a polymer pot by a ball mill. Then, the green sheet 12 having a thickness of 10 to 100 $\mu$m was formed by the doctor blade method.

On the other hand, a sheet serving as the removal inhibiting layer 15 was formed by the same method as the green sheet 12 except that the spinel powder was not added.

Next, the green sheet 12 and the sheet serving as the removal inhibiting layer 15 were cut in a 70-mm square and shaped, and a plurality of the green sheets 12 and the sheet serving as the removal inhibiting layer 15 were laminated in the desired order, and then pressed by a hydrostatic isostatic press to obtain the green compact 14.

Next, dry film resist "BF-405" (produced by Tokyo Ohka Co., Ltd.) was laminated on the upper surface of the green compact 14 under heating at 80° C., and exposed to ultraviolet rays through the predetermined pattern mask. The exposure conditions included 365 nm and 200 mJ/cm$^2$. Then, spray development was carried out with an aqueous solution of 0.3% by weight sodium carbonate at a liquid temperature of 30° C. to form the resist material 13 having the opening 16 on the green sheet compact 14.

Next, the portions of the green sheets 12, which were exposed through the opening 16, were removed by the sand blasting method using the "Newma Blaster-SC-3 type" sand blasting machine (produced by Fuji Seisakusho Co., Ltd.) until the removal inhibiting layer 15 was completely exposed from the opening 16. In this processing, the distance between the nozzle and the green sheets 12 was 8 cm, and fused alumina "#1000" was used as abrasive grains under a discharge pressure of 3 kg/cm$^2$.

Next, the thus-obtained unfired structure 18 was immersed in an aqueous solution of 10% by weight monoethanol amine at a liquid temperature of 45° C. to remove the resist material 13.

Then, the structure 18 was fired at a temperature of 1600° C. for 2 hours in air by using a batch type electric furnace to obtain the sintered body 19 having the dielectric strip 6 or 7, and the wing 8 or 9.

In a plurality of the thus-obtained sintered bodies 19, neither cracking nor chipping occurred in the wing 8 or 9, and the dielectric strip 6 or 7 had a small variation (standard error) in width W of 10 µm or less.

EXAMPLE 2

In Example 2, the Example 1 was partially modified.

Namely, Example 2 was different from Example 1 in that the resist material 13 was formed by the screen printing method using polyvinyl alcohol and a pattern having the opening 16, and the resist material 13 was removed at the same time as the firing step. The other steps were the same as Example 1.

In a plurality of the thus-obtained sintered bodies 19, neither cracking nor chipping occurred in the wing 8 or 9, and the dielectric strip 6 or 7 had a small variation (standard error) in width W of 10 µm or less.

EXAMPLE 3

Example 3 relates to the second embodiment shown in FIGS. 2A–2H.

The green sheet 12 and the sheet serving as the removal inhibiting layer 15 were formed by the same method as in Example 1.

First, a plurality of the green sheets 12 were cut in a 70-mm square, shaped, laminated, pressed by a hydrostatic isostatic press, and then fired at a temperature of 1600° C. for 2 hours in air by using a batch type electric furnace to obtain the sintered ceramic substrate 20.

Next, the plurality of the green sheets 12 and the sheet serving as the removal inhibiting layer 15 were cut in a 70-mm square or smaller, shaped, and pressed by the hydrostatic isostatic press, and then fixed on the ceramic substrate 20 to form the composite laminate 21 shown in FIG. 2C.

Then, the formation of the resist material 13, the removal the portions of the green sheets 12, which were exposed through the opening 16, the removal of the resist material 13, and the firing of the structure 18a, were carried out in turn by the same procedure as in Example 1 to obtain the sintered body 19 having the dielectric strip 6 or 7 and the wing 8 or 9.

In the thus-obtained sintered bodies 19 obtained in Example 3, neither cracking nor chipping occurred in the wing 8 or 9, and the dielectric strip 6 or 7 had a small variation (standard error) in width W of 10 µm or less.

As described above, the method of manufacturing a dielectric waveguide comprises removing the predetermined portion of a green compact or a green sheet in a green state instead of processing a ceramic sintered body, thereby permitting processing for obtaining a desired shape within a short time without causing cracking and chipping. In addition, the method of shaping the dielectric strip and the wing does not require the conventional step of laminating green sheets in each of which an opening or notch has been previously formed, and thus it is not necessary to strictly align a plurality of green sheets, thereby providing an improvement in the efficiency of the manufacture of a dielectric waveguide.

In the step of patterning a resist material in a desired shape for removing the predetermined portion of the green compact or the green sheet, the resist material can be patterned by using a photolithographic technique which enables fine patterning, thereby precisely defining the dimensions of the dielectric strip and the wing, and improving the dimensional precision.

Furthermore, in removing the predetermined portion of the green compact or the green sheet, a removal inhibiting layer comprising a difficult-to-remove material is provided so that the removing step is performed until the removal inhibiting layer is exposed. Therefore, it is possible to provide a margin for time control of the removing step, and to previously set the desired amount of removal with good reproducibility. This also contributes to an improvement in the precision of the shape and dimensions of the dielectric waveguide.

Therefore, the method of manufacturing a dielectric waveguide is capable of efficiently manufacturing a dielectric waveguide with high reliability and precision at low cost.

Particularly, in the second aspect of the present invention, green sheets for forming a part of the dielectric strip are fixed on a sintered ceramic substrate for forming the remainder of the dielectric strip and the wing, and then processing such as removal of the predetermined portions of the green sheets is performed. Therefore, it is possible to securely prevent deformation of the green sheets during progress of the steps, further improve workability, and further improve the reliability, the precision, and the manufacturing efficiency.

In order to obtain a green compact, a plurality of the green sheets are laminated in the first aspect of the present invention, or a plurality of the green sheets are laminated on the ceramic substrate in the second aspect of the prevent invention, whereby the thickness of each of the dielectric strip and the wing can easily be controlled according to the number of the green sheets laminated.

In the second aspect of the present invention, when the ceramic substrate and the green sheets comprise the same ceramic material, the adhesion between both materials can be improved in the firing step.

In the present invention, by using the sand blasting method for removing the predetermined portion of the green compact or the composite laminate, the predetermined portions of the green sheets containing moisture and an organic component can be removed relatively deeply with a high dimensional precision without causing a problem. Therefore, the sand blasting method can be said to be particularly suitable for manufacturing a dielectric waveguide comprising a dielectric strip and a wing.

In the present invention, when the resist material is removed by pyrolysis in the firing step, a special step for removing the resist material is unnecessary, further simplifying the process for obtaining a dielectric waveguide.

Although the present invention has been described in relation to particular embodiments thereof, many other variations and modifications and other uses will become apparent to those skilled in the art. Therefore, the present invention is not limited by the specific disclosure herein.

What is claimed is:

1. A method of manufacturing a dielectric waveguide comprising a plurality of conductors having substantially parallel planes, a dielectric strip arranged between the planes of the plurality of conductors, and a wing integrally formed with the dielectric strip to extend from the dielectric strip along each of the planes of the conductors, the method comprising the steps of:

preparing a green compact containing an inorganic powder and an organic binder for forming the dielectric strip and the wing from a part of the green compact;

wherein the step of preparing the green compact includes the step of providing a removal inhibiting layer comprising a difficult-to-remove material having a lower removal rate than that of the green compact in the part of the green compact corresponding to the wing;

forming a resist material on an outer surface of the green compact, a position of the resist material defining an opening corresponding to the wing;

removing a portion of the green compact, which is exposed through the opening, to a desired amount until the removal inhibiting layer is exposed, by using the resist material as a mask to form an unfired structure having a shape comprising the dielectric strip and the wing;

removing the resist material;

firing the unfired structure to obtain a sintered body having the dielectric strip and the wing;

providing one of the plurality of conductors on a surface of the sintered body opposite the dielectric strip; and arranging two sintered bodies in a state in which respective dielectric strips of the two sintered bodies are opposed to each other.

2. The method of manufacturing the dielectric waveguide according to claim 1, wherein the step of preparing the green compact comprises the step of preparing a plurality of green sheets each containing the inorganic powder and the organic binder, and the step of laminating the plurality of the green sheets together with the removal inhibiting layer.

3. The method of manufacturing the dielectric waveguide according to claim 1, wherein the step of removing the portion of the green compact, which is exposed through the opening, is carried out by sand blasting.

4. The method of manufacturing the dielectric waveguide according to claim 3, wherein the difficult-to-remove material has a composition containing a larger amount of organic component than that of the green compact.

5. The method of manufacturing the dielectric waveguide according to claim 4, wherein the difficult-to-remove material contains substantially no inorganic component.

6. The method of manufacturing the dielectric waveguide according to claim 1, wherein the step of removing the resist material is carried out at the same time as the step of firing the structure.

7. The method of manufacturing the dielectric waveguide according to claim 6, wherein the step of removing the resist material further comprises the step of removing at least a portion of the organic binder.

8. The method of manufacturing the dielectric waveguide according to claim 1, wherein the step of removing the resist material further comprises the step of removing at least a portion of the organic binder.

* * * * *